United States Patent [19]
Metzler

[11] 3,829,937
[45] Aug. 20, 1974

[54] APPLIANCE FOR LINEAR BODIES
[75] Inventor: Allan R. Metzler, Aurora, Ohio
[73] Assignee: Preformed Line Products Company, Cleveland, Ohio
[22] Filed: Sept. 13, 1972
[21] Appl. No.: 288,754

[52] U.S. Cl. ............ 24/122.6, 174/79, 174/DIG. 12, 24/115 R, 403/275
[51] Int. Cl. ........................................... F16g 11/04
[58] Field of Search ........... 24/126 C, 126 L, 122.6; 248/63; 174/DIG. 12; 403/275

[56] References Cited
UNITED STATES PATENTS

| | | | |
|---|---|---|---|
| 728,689 | 5/1903 | Amenoe | 24/122.6 |
| 1,824,005 | 9/1931 | Astley | 24/122.6 |
| 2,016,856 | 10/1935 | Fiege | 24/122.6 |

FOREIGN PATENTS OR APPLICATIONS

| | | | |
|---|---|---|---|
| 14,869 | 12/1885 | Great Britain | 24/122.6 |
| 190,769 | 12/1922 | Great Britain | 24/126 C |
| 302,063 | 12/1928 | Great Britain | 24/126 L |
| 247,559 | 10/1926 | Great Britain | 24/126 C |
| 986,728 | 8/1951 | France | 24/122.6 |

Primary Examiner—Bernard A. Gelak
Attorney, Agent, or Firm—Hume, Clement, Brinks, Willian, Olds & Cook, Ltd.

[57] ABSTRACT

A termination appliance for a load bearing cable is particularly suited for extraordinarily high load applications. The appliance is formed by a pair of tandem, partially overlapping protuberance sub-assemblies, each sub-assembly being formed by an ellipsoidal member that is secured relative to the cable by a set of helical rods wrapped in tightly encircling relation over the member and extending in opposite direction therefrom in gripping relation with the cable. The sub-assemblies are disposed in a common housing with the forward portion of each sub-assembly seating against a respective restraining structure so that loads applied to the cable are shared by the respective sub-assemblies. Other features are disclosed.

10 Claims, 2 Drawing Figures

PATENTED AUG 20 1974 3,829,937

APPLIANCE FOR LINEAR BODIES

The present invention relates generally to appliances for linear bodies and, more particularly, is directed to cable termination appliances, commonly known as dead-ends. The structure of the present invention is particularly suited to applications where the appliance must reliably withstand extraordinarily high loadings, and to such extent the present invention constitutes an improvement over the structure disclosed and claimed in U.S. Pat. No. 3,573,346—Appleby, assigned to the same assignee as the present invention.

SUMMARY OF THE INVENTION

The invention provides a single integrated structure of a unique design for high loading applications, for example, cable tension forces from 200,000 to 650,000 pounds. The appliance of the present invention also embodies the various features and advantages characteristic of the structure of the aforesaid patent and may also take advantage of the preassembly techniques disclosed in co-pending application Ser. No. 187305, filed Oct. 7, 1971 and assigned to the same assignee as the present invention.

In accordance with the present invention, a termination appliance for a load bearing cable or the like comprises a first protuberance means including a first member applied about the cable and a first set of helically preformed elements of a predetermined internal diameter and pitch length wrapped in tightly encircling relation about the first member and extending along the cable for respective predetermined distances in either direction therefrom. The first set of helical elements secures the first member to the cable so as to form a first protuberance on the cable in the region of the first member. A second protuberance means comprises a second member applied about the first set of helically preformed elements in spaced relation to the first member and a second set of helically preformed elements of a predetermined internal diameter and pitch length wrapped in tightly encircling relation about the second member and extending for respective predetermined distances in either direction therefrom. The second set of helical elements secures the second member relative to the cable in overlying relation to the first set of helical elements to form a second protuberance on the cable in the region of the second member. There is also provided a housing means having an open receiving end of a diameter exceeding the maximum diameter of either of the protuberances and an opposite restraining end having sidewalls for seating one of the first and second protuberances and an aperture of a diameter intermediate that of the cable and the maximum diameter of the seated protuberance for passing the cable. The housing further includes a passage interconnecting the receiving and restraining ends and a restraining structure disposed within the housing passage intermediate the first and second protuberances for seating the remaining protuberance and for effecting a sharing between the first and second protuberance means of the load on the load bearing cable.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several FIGURES of which like reference numerals identify like elements and in which:

DESCRIPTION OF THE PREFERRED EMBODIMENTS

Figure 1:
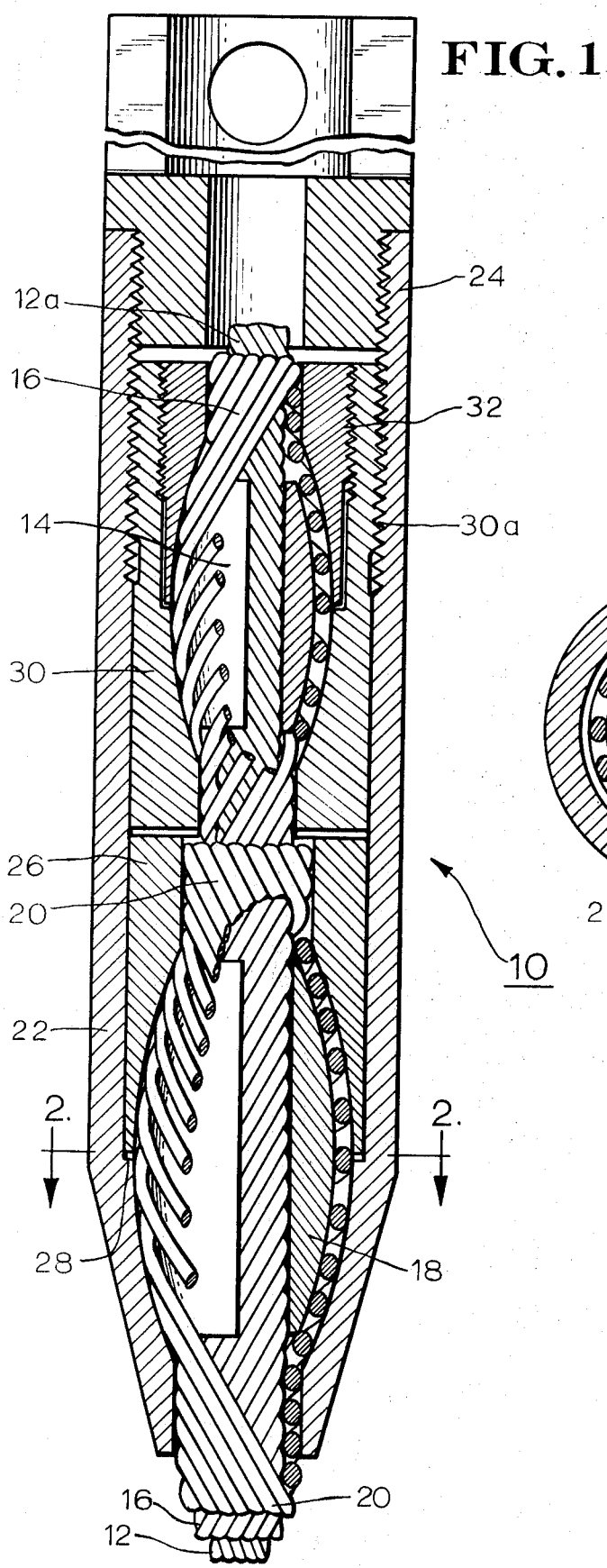
FIG. 1 is a longitudinal section of a termination appliance embodying the present invention.
Figure 2:
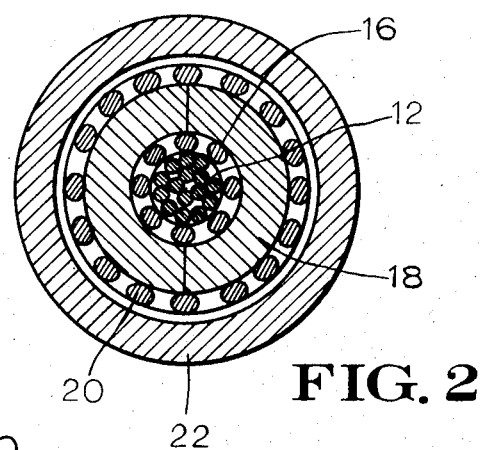
FIG. 2 is a cross-sectional view taken along lines 2—2 of FIG. 1.

Referring now to the drawings, the termination appliance 10 there illustrated is adapted to receive and retain one end of an elongated load bearing cable 12. The appliance 10 which will be described in the typical order of its assembly comprises a first protuberance means including a first member 14 that is applied about the cable 12 adjacent its terminus 12a. The first member 14 is preferably of the illustrated egg-shaped or ellipsoidal contour having a central bore of sufficient diameter for passing the cable 12. The member 14 may be of a one-piece construction in which event it is slidably inserted over the terminus 12a of the cable 12 or, on the other hand, it may be composed of a pair of mating sections applied directly about the cable. Although the egg configuration is preferred, those skilled in the art will recognize that the first member 14 may be of a different contour such as a cylinder or a tapered wedge.

In any event, a first set of helically preformed elements 16 of a predetermined pitch length and of a nominal internal diameter somewhat smaller than that of the cable 12 is wrapped in tightly encircling relation about the member 14 and arranged to extend along the cable 12 in tightly gripping relation therewith for respective predetermined distances in either direction from the member 14. As will be recognized by those skilled in the art, the first set of helical elements 16 serves to secure the first member 14 to the cable 12 so as to form a first protuberance on the cable in the region of the first member. It will be noted that the helical rods 16 are asymmetrically disposed relative to the egg-shaped member 14, the rods extending only a very short distance rearwardly of the member 14 but a very substantial distance forward of the member 14. The described protuberance sub-assembly is well known to the art and methods and means for forming such protuberances are disclosed and claimed in U.S. Pat. No. 3,007,243—Peterson, assigned to the same assignee as the present invention.

A second protuberance means which may be of a construction generally similar to that just described is applied over the forward extending portion of the helical rod set 16. Specifically, the second protuberance means comprises a second egg-shaped member 18 composed of mating half-sections applied in overlying relation to the rod set 16 and the cable 12. The second egg-shaped member 18 is secured in position by a second set of helically preformed elements 20 that are wrapped in tightly encircling relation about the member 18 and which extend in opposite directions therefrom in overlying and gripping relation to the first set of helical rods. Like the first rod set 16, the second set is asymmetrically disposed relative to the member 18. Specifically, the helical rods 20 terminate immediately rearwardly of the member 18 at a point spaced from the first member 14 while the rod set 20 extends a substantial distance forwardly of the member 18 and terminates at or just short of the point of termination of the first set of helical rods 16. The second egg-shaped member 18 is somewhat larger in size than the first member 14 in view of the fact that the member 18 is applied over the helical rod set 16 rather than directly to the narrower diameter cable 12. For like reasons, the nominal internal diameter of the second helical rod set 20 may be somewhat greater than that of the first rod set 16. The helical rod sets 16 and 20 are illustrated as being of an opposite hand of lay and such is presently preferred although it will be understood that the rods may be of a like hand of lay, if desired.

The tandem, partially overlapping protuberance subassembles 14, 16 and 18, 20, respectively, are slidably received in an elongated hollow housing means 22 having a lower or restraining end at which the cable 12 enters the housing and an upper or receiving end to which a clevis 24 is threadably secured. The clevis 24 serves to provide a mechanical interconnection between the appliance 10 and a fixed body or support (not shown). It will be understood that clevis 24 may assume a variety of physical forms according to the structure to which it is desired to attach the appliance.

The housing 22 is of a generally cylindrical contour along its upper portion with the lower portion assuming a gradually conical taper; an interior passage extending through the full length of the housing 22 is of generally similar configuration. In assemblying the appliance, the tandem protuberance sub-assemblies are slidably inserted into the housing through the open receiving end. The housing passage at the receiving end is of a diameter exceeding that of either protuberance structure while the aperture at the restraining end of the housing 22 is of a diameter intermediate that of the cable 12 and the maximum diameter of the protuberance structure 18, 20. As shown, the passageway at the restraining end of the housing 22 is contoured to complement and seat the forward half of the protuberance 18, 20.

The rearward portion of the protuberance 18, 20 and the remaining protuberance structure 14, 16 are fixedly located in the housing by a multiple component restraining structure. Specifically, the restraining structure comprises a first adapter means 26 composed of a pair of mating half-sections which cooperatively define a contoured seat for the rearward half of the protuberance structure 18, 20. The forward end of the adapter member 26 seats on an annular shoulder or flange 28 formed in the sidewall of the housing 22. The adapter member 26 is of a normal exterior diameter conforming to the internal diameter of the housing passage so as to fully occupy the space intermediate the protuberance and the housing sidewalls.

The protuberance structure 14, 16 is similarly restrained within the housing 22 by a second adapter member 30 composed of a pair of mating half-sections of an interior contour complementary to the forward portion of the protuberance structure 14, 16. Unlike the first adapter member 26, the second adapter 30 is threadably secured to the interior of the housing at 30a.

The two section adapter member 30 is completed by a third section 32 which is of an outer cylindrical contour and an interior contour complementary to the rearward half-section of the protuberance 14, 16. The section 32 is threadably received within the back portion of the mating half-sections of the adapter member 30 so as to securely locate the rearward portion of the protuberance 14, 16. The clevis 24 completes the appliance assembly.

In operation, the loading on the cable 12 is shared between the protuberance assemblies 18, 20 and 14, 16. Specifically, loading on the cable 12 results in the protuberance structure 18, 20 being drawn tightly down into the restraining end of the housing 22 while the protuberance 14, 16 is drawn into secure engagement with the fixedly located adapter member 30. Adjustments in the relative loadings of the protuberance structures may be effected by adjusting the axial location of the adapter member 30 relative to the protuberance structure 14, 16.

While particular embodiments of the present invention have been shown and described, it is apparent that various changes and modifications may be made, and it is therefore intended in the following claims to cover all such modifications and changes as may fall within the true spirit and scope of this invention.

I claim:

1. A termination appliance for a load bearing cable or the like, comprising:

first protuberance means comprising a first member applied about said cable and a first set of helically preformed elements of a predetermined internal diameter and pitch length wrapped in tightly encircling relation about said member and extending along said cable for respective predetermined distances in either direction therefrom for securing said first member to said cable so as to form a first protuberance on said cable in the region of said first member;

second protuberance means comprising a second member applied about said first set of helically preformed elements in spaced relation to said first member and a second set of helically preformed elements of a predetermined internal diameter and pitch length wrapped in tightly encircling relation about said second member and extending for respective predetermined distances in either direction therefrom for securing said second member relative to said cable in overlying relation to said first set of helical elements to form a second protuberance on said cable in the region of said second member;

housing means having an open receiving end of a diameter exceeding the maximum diameters of either of said protuberances, a restraining end having sidewalls for seating one of said first and second protuberances and an aperture of a diameter intermediate that of said cable and the maximum diameter of said protuberances for passing said cable, a housing passage interconnecting said receiving and restraining ends, and a restraining structure disposed in said housing passage intermediate said first and second protuberances for seating the other of said first and second protuberances and effecting a sharing between said first and second protuberance means of the load on said load bearing cable.

2. The termination appliance of claim 1 in which said second protuberance means is seated against said restraining end of said housing and in which that portion of said second set of helically preformed elements extending toward said first member terminates in advance of said first member.

3. The termination appliance of claim 2 in which that portion of said second set of helically preformed elements extending away from said first member terminates in advance of that portion of said first set of helically preformed elements extending in a like direction.

4. The termination appliance of claim 3 in which said restraining structure comprises a first adapter member composed of a pair of mating sections cooperatively defining a contoured seating portion for seating said second protuberance and having external threads for effecting a threaded interconnection to said housing means for fixedly locating said adapter member in said housing means.

5. The termination appliance of claim 4 in which said first and second members are of a generally ellipsoidal configuration.

6. The termination appliance of claim 5 in which said restraining structure further includes a second adapter member composed of a pair of mating sections slidably fitted into said housing passage intermediate said first adapter member and the adjacent portion of said second protuberance for filling the space intermediate said first adapter member and said second protuberance and limiting longitudinal movement of said second protuberance means.

7. The termination appliance of claim 6 in which said second adapter member further includes a third section at least partially received within said first pair of sections in threaded engagement therewith and in engagement with that portion of said first protuberance remote from said second protuberance.

8. The termination appliance of claim 7 in which said housing means passage is of an elongated cylindrical contour and in which the adjacent portions of said first and second adapter members are of a conforming cylindrical contour.

9. The termination appliance of claim 8 and further including a clevis member threadably connectable to said housing means at said open receiving end.

10. The termination appliance of claim 1 in which said first and second sets of helically preformed elements are of an opposite hand of lay.

* * * * *